US010359079B2

(12) United States Patent
Sowa

(10) Patent No.: US 10,359,079 B2
(45) Date of Patent: Jul. 23, 2019

(54) COUPLING ELEMENT AND COUPLING ASSEMBLY FOR AXIAL TORQUE TRANSMISSION, AND DISC ASSEMBLY THEREFOR

(71) Applicant: REXNORD GMBH, Betzdorf (DE)

(72) Inventor: Rudolf Sowa, Olfen (DE)

(73) Assignee: REXNORD GMBH, Betzdorf (DE)

( * ) Notice: Subject to any disclaimer, the term of this patent is extended or adjusted under 35 U.S.C. 154(b) by 0 days.

(21) Appl. No.: 15/533,753

(22) PCT Filed: Dec. 9, 2015

(86) PCT No.: PCT/EP2015/079149
§ 371 (c)(1),
(2) Date: Jun. 7, 2017

(87) PCT Pub. No.: WO2016/096576
PCT Pub. Date: Jun. 23, 2016

(65) Prior Publication Data
US 2017/0363153 A1 Dec. 21, 2017

(30) Foreign Application Priority Data
Dec. 19, 2014 (DE) .......... 10 2014 019 266

(51) Int. Cl.
F16D 3/79 (2006.01)
F16D 3/78 (2006.01)
(Continued)

(52) U.S. Cl.
CPC ............ F16D 3/78 (2013.01); F16D 3/72 (2013.01); F16D 3/79 (2013.01); F16B 37/00 (2013.01)

(58) Field of Classification Search
CPC .... F16D 3/72; F16D 3/78; F16B 37/00; F16B 37/044
(Continued)

(56) References Cited

U.S. PATENT DOCUMENTS 1,119,843 A    12/1914  Law
2,499,093 A *  2/1950   Webb .................. F16D 3/78
                                                  464/94
(Continued)

FOREIGN PATENT DOCUMENTS

CN    2285388 Y    7/1998
DE    1910167 A1   10/1969
(Continued)

OTHER PUBLICATIONS

International Search Report and Written Opinion dated Feb. 23, 2016 in connection with PCT/EP2015/079149.
(Continued)

Primary Examiner — Greg Binda
(74) Attorney, Agent, or Firm — Quarles & Brady LLP

(57) ABSTRACT

Coupling element for the axial transmission of torque, having at least a first and a second connection element for connecting rotatable machine parts, for example passive and active drive shafts or connection elements of further coupling elements, and an elastomeric multiple disc arrangement which is arranged axially in between and is connected via a plurality of fastening arrangements alternately to the first and second connection element, with the result that the connection elements are connected to one another in a torsionally rigid but axially and angularly movable manner. Moreover, a multiple disc arrangement for a coupling element of this type and a coupling arrangement comprising at least two coupling elements of this type are disclosed.

11 Claims, 4 Drawing Sheets

(51) Int. Cl.
*F16D 3/72* (2006.01)
*F16B 37/00* (2006.01)

(58) Field of Classification Search
USPC ........ 464/94–96, 98, 99; 411/112, 172, 427,
411/436; 16/2.1, 2.4
See application file for complete search history.

(56) References Cited

U.S. PATENT DOCUMENTS

| | | | |
|---|---|---|---|
| 3,393,536 A * | 7/1968 | Hans-Karl | ................ F16D 3/50 |
| 4,055,966 A | 11/1977 | Fredericks | |
| 4,744,783 A | 5/1988 | Downey et al. | |
| 5,019,015 A | 5/1991 | Wasserfuhr | |
| 5,135,341 A | 8/1992 | Leyder | |
| 5,730,540 A * | 3/1998 | Duran | ................... F16B 5/0208 |
| | | | 411/112 |
| 5,855,462 A | 1/1999 | Weiss | |
| 5,888,140 A * | 3/1999 | Klingler | ................... F16D 3/72 |
| | | | 464/99 |
| 5,944,611 A | 8/1999 | McCullough | |
| 2010/0099505 A1 | 4/2010 | Corey | |
| 2012/0121360 A1* | 5/2012 | Karl | ....................... F16B 37/043 |
| | | | 411/172 |

FOREIGN PATENT DOCUMENTS

| | | | | |
|---|---|---|---|---|
| DE | 38 07 001 A1 * | 9/1989 | .................... | 411/112 |
| DE | 19709950 A1 | 11/1997 | | |
| DE | 19625318 A1 | 1/1998 | | |
| EP | 0 184 051 A1 | 6/1986 | | |
| GB | 285167 | * 2/1928 | ..................... | 464/94 |
| SU | 887655 | * 12/1981 | ..................... | 464/99 |
| WO | 2014140128 A2 | 9/2014 | | |

OTHER PUBLICATIONS

The State Intellectual Property Office of the People's Republic of China, First Office Action and Search Report, Application No. 201580069083.2, May 9, 2018, 22 pages.
The State Intellectual Property Office of the People's Republic of China, Second Office Action and Search Report, Application No. 201580069083.2, Sep. 25, 2018, 22 pages.

* cited by examiner

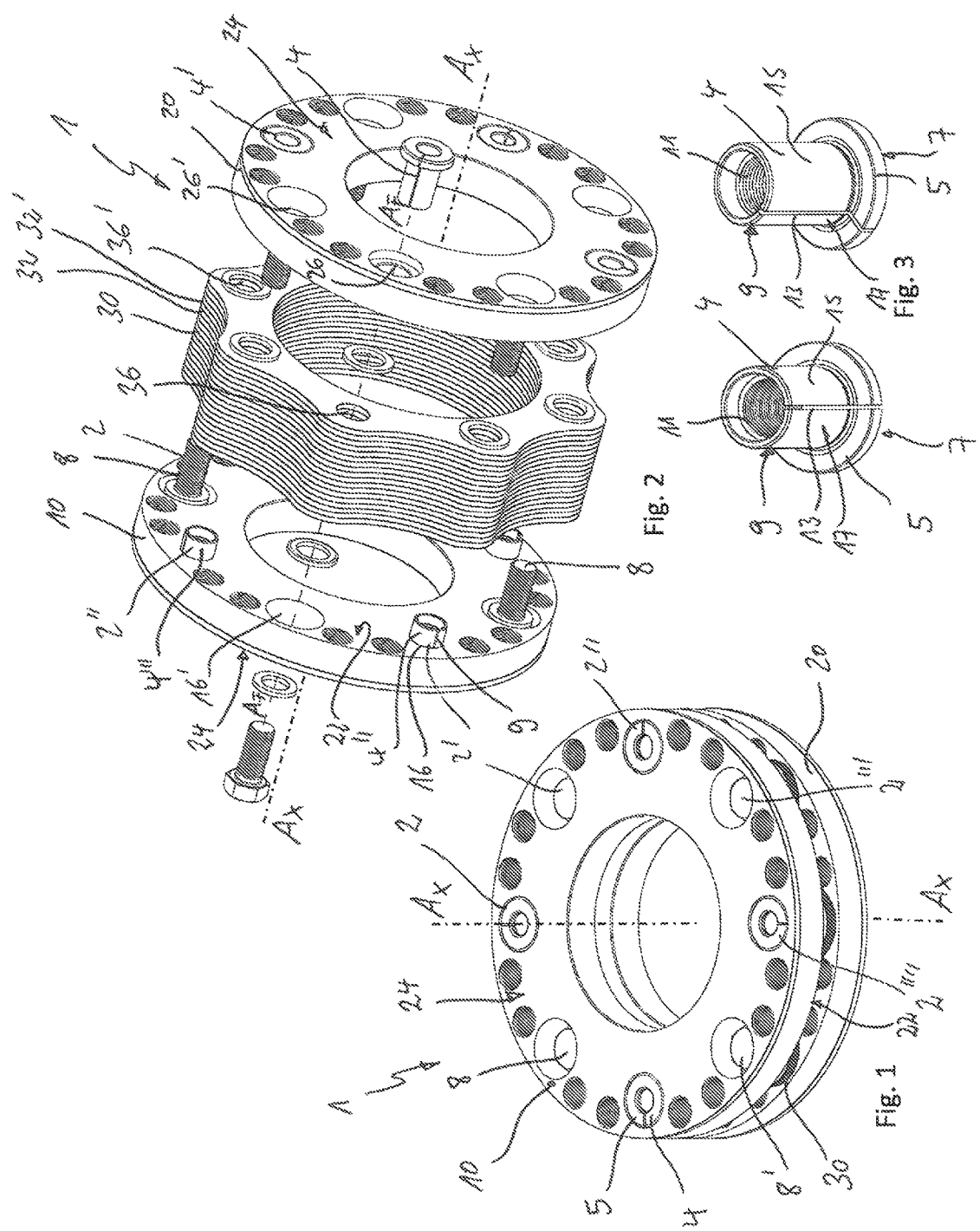

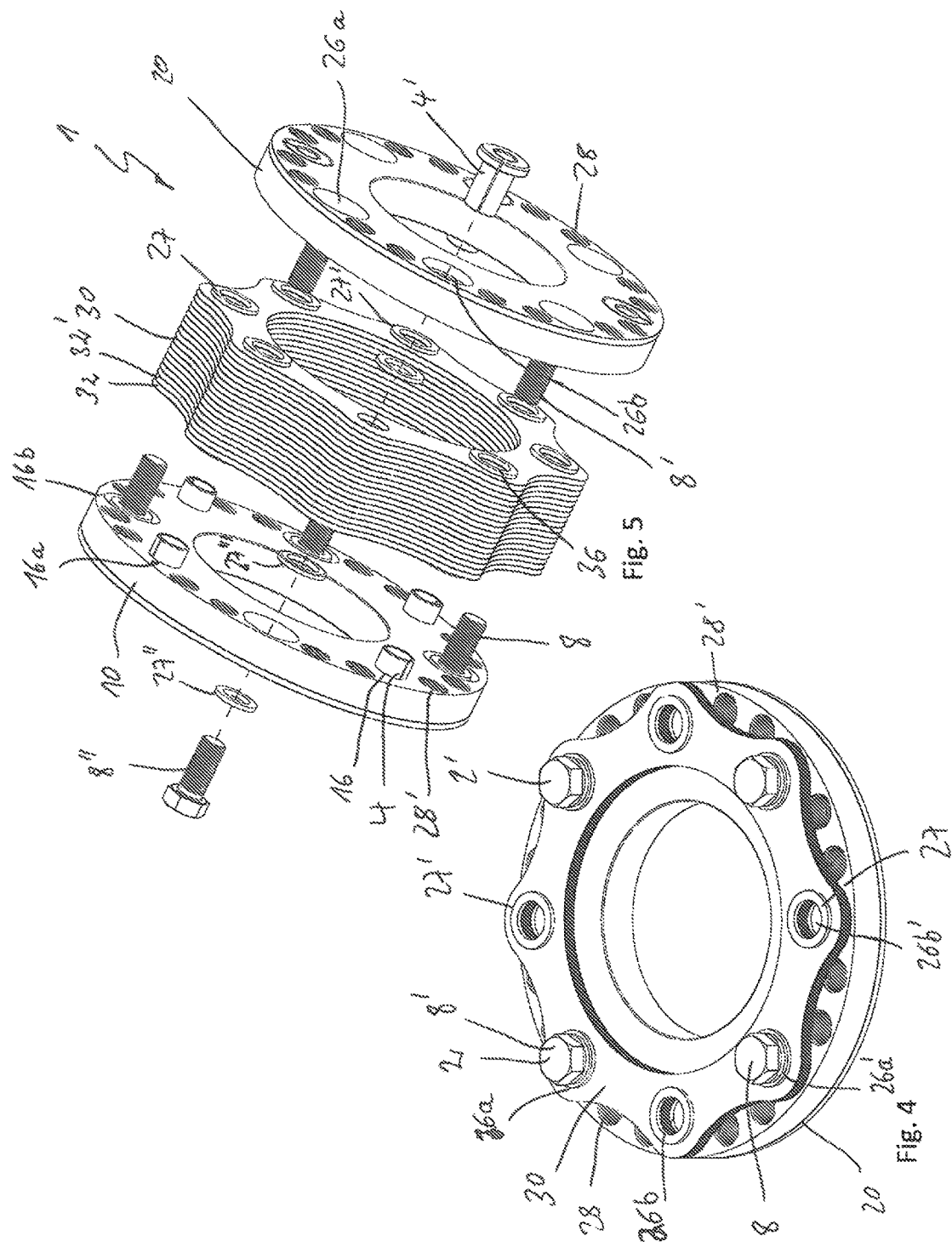

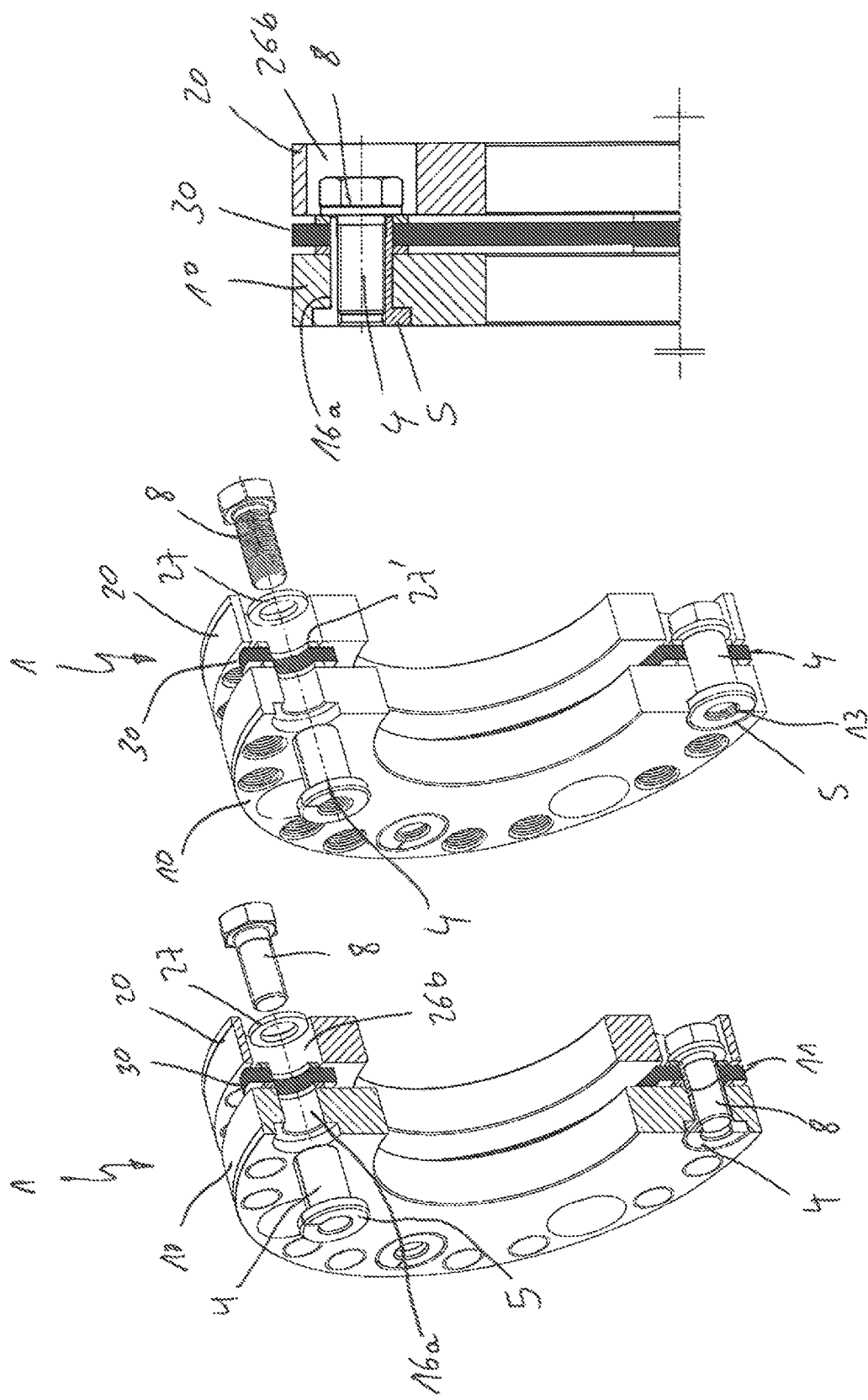

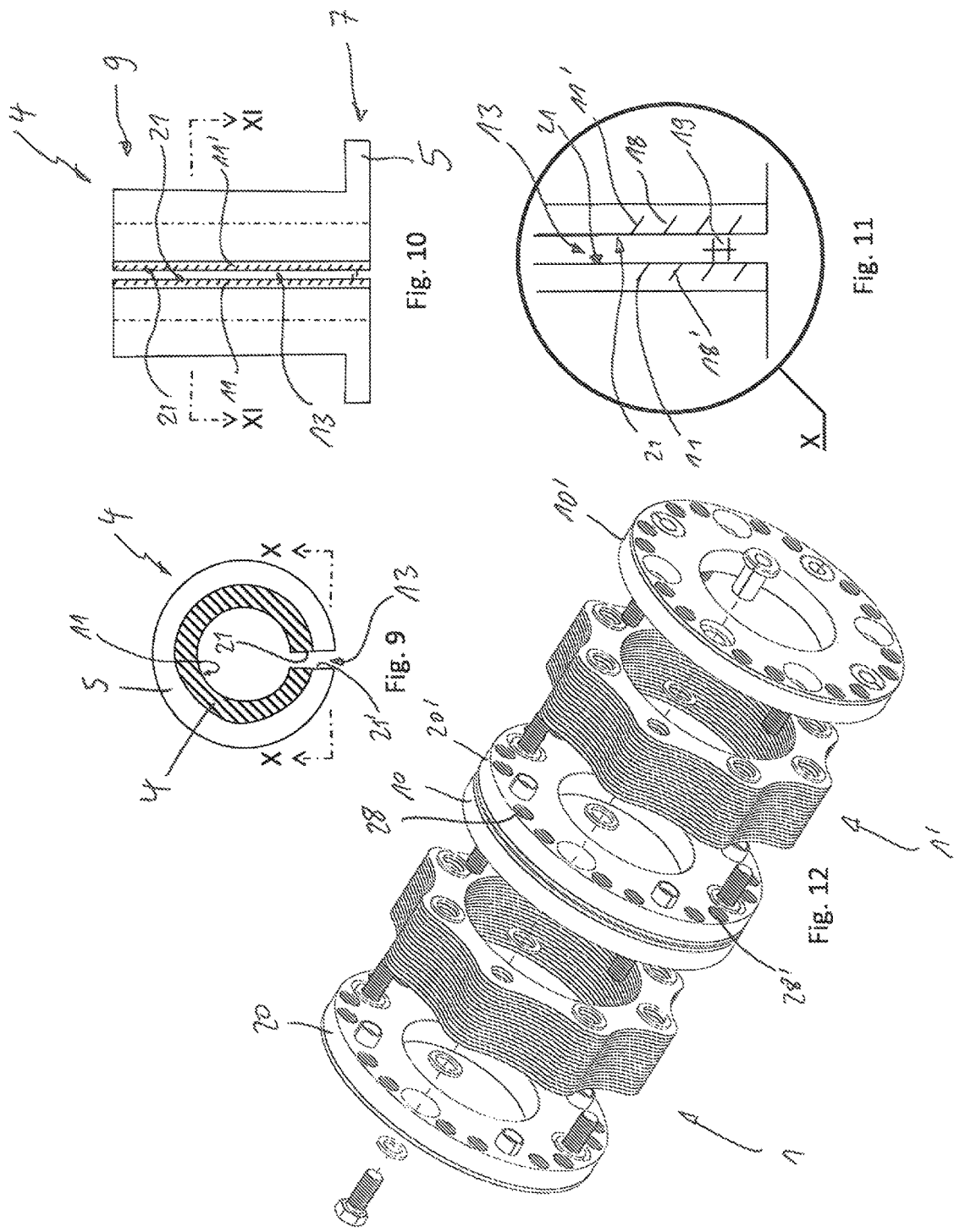

US 10,359,079 B2

COUPLING ELEMENT AND COUPLING ASSEMBLY FOR AXIAL TORQUE TRANSMISSION, AND DISC ASSEMBLY THEREFOR

CROSS-REFERENCE TO RELATED APPLICATIONS

This application represents the national stage entry of PCT International Application No. PCT/EP2015/079149 filed on Dec. 9, 2015, which claims the benefit of German Patent Application No. 10 2014 019 266.0 filed on Dec. 19, 2014, the entire contents of which are incorporated herein by reference for all purposes.

TECHNICAL FIELD

The present invention relates to a coupling element for axial torque transmission, comprising at least one first and one second connection element for connecting rotatable machine parts, such as passive or active drive shafts or connection elements of further coupling elements, and an axially interposed resilient disc assembly alternately connected to the first and second connection element via a plurality of attachment assemblies so that the connection elements are connected to each other in a torsionally rigid but axially and angularly movable manner, wherein the disc assembly is composed of a plurality of resilient discs.

Moreover, the invention relates to a disc assembly for application with such a coupling element, and a coupling assembly comprising at least two such coupling elements.

BACKGROUND

Such coupling elements and coupling assemblies as well as disc assemblies therefor are known from the state of the art. They are also known as disc couplings, because one or more disc elements are arranged between each of the connection elements for connecting rotatable machine parts, and in particular they serve for axial and angular compensation, they transfer torques, however, with low losses between the two connection elements and thus between the two machine parts to be connected. The couplings primarily serve to compensate angular and axial imprecision in the alignment of the two connection elements, or any connected machines relative to each other. The more rigid the disc assembly, the better is the torque transmission, but the lower is the tolerance when compensating the angular and axial misalignments.

Usually the connections to the surrounding connection elements are alternately arranged, which means, for example, that in a disc assembly having four attachment points, each even attachment point is fixed to the first connection element and each odd attachment point is fixed to the second connection element. This is continued with disc assemblies having more than four attachment points, wherein preferably each disc assembly has an even number of attachment points.

By coupling several coupling elements and preferably two coupling elements to form a coupling assembly in this way, various machine parts can be connected to each other in a torsionally rigid manner with high reliability and strict alignment tolerance.

As a general rule: the higher the power density, the speed or the number of load reversals, to which such a coupling element is exposed, the higher the requirements in terms of lack of play, tolerance and the precision of the fit of the parts connected with each other. The better the values that are achieved here, the higher the loads that can be applied to the coupling element and the more effective and loss-free is the transmission of torques.

To connect the disc assembly with each connection element, various embodiments and methods are known from the state of the art.

It is known, for example, to simply couple connecting elements with the disc assembly by means of frictional connections, such as by means of inserting compression bolts through complementary holes in the connection elements and the disc assembly and by clamping them by means of counter elements, such as nuts. A drawback in such embodiments is, however, the large play between the disc assembly and the connection element, so that torques are transmitted with greatly reduced efficiency.

To solve the problem, attempts have been made among others to use an interlocking connection instead of a frictional connection between the disc assembly and the connection elements, such as by pressing a compression bolt through complementary holes of the disc assembly and the connection elements. This guarantees improved power transmission. A drawback of such an embodiment, however, is that for insertion of the compression bolt a predefined relative positioning of the disc assembly and the connection elements with respect to each other has to be established. This is ensured among other things by fixing each element in an assembly apparatus, wherein the holes or recesses for inserting the compression bolts are provided after fixing. Since the dimensional accuracy of the holes in the disc assembly and the connection elements relative to each other is of critical importance, the disc assembly and the connection elements must not be released from the assembly apparatus prior to insertion of the compression bolt in the hole. This means that prefabrication and stockpiling of individual components is not possible. It is only possible to drill one fixed composition of a disc assembly and connection elements and subsequently immediately fix them with the compression bolt. This is costly and time consuming. Moreover, it has been found that, for interlocking pressing of the compression bolt, a cutting head is necessary on the free end of the compression bolt, which is also costly and time-consuming to manufacture. Moreover, should an error occur during pressing, the connection elements and/or the disc assemblies, or their individual discs, have to be disposed of as rejects, since renewed interlocking pressing of a compression bolt is no longer possible.

In order to prevent costly manufacture of cutting heads on compression bolts, it has also been known for compression bolts to be cooled down to such a degree that they can simply be fitted into holes in the disc assembly and the connection elements due to their reduced diameter. After reheating of the compression bolt, the result is an almost play-less interlocking connection between the disc assembly and the connection element. A drawback with this is, however, the time needed for cooling down and warming up the compression bolt and moreover the indispensable pre-positioning of connection element and disc assembly in an assembly apparatus to ensure play-less and precise arrangement of each of the components. A further drawback is that disassembly of the coupling elements or the coupling assemblies when using the above method is not possible or only very cumbersome and mostly involves the exchange of several components.

From U.S. Pat. No. 5,944,611, a coupling element of the initially mentioned type is known, in which a preassembled disc assembly is alternately connected to first and second connection elements via bolt connections. The disc assembly is fixed as a pre-assembled package via bolts to the connection elements.

DE 197 09 950 shows a similar arrangement. Again, for establishing a coupling element, a preassembled disc assembly is alternately connected to first and second connection elements as a package by means of bolt connections. The disc assembly has a plurality of discs fixedly connected to each other relative with respect to each other in the horizontal direction by means of a clamping sleeve flanged at the edge.

A similar coupling element is also disclosed in WO 2014/140128. Herein, fixing of a disc assembly preassembled as a package comprising a plurality of discs horizontally pre-aligned by means of a clamping sleeve, is established by means of bolts which are oversize to reduce assembly play between the disc assembly and the bolts, which is reduced as the disc assembly is fixed due to transverse contraction of the bolt.

SUMMARY OF THE INVENTION

All of the coupling elements known from the state of the art have the drawback that adaption of the disc assembly can only be achieved in a cumbersome manner.

It is thus the object of the present invention to provide a coupling assembly and a coupling element which can be manufactured cheaply and more quickly than known from the state of the art.

In particular, the object is achieved by a coupling element for axial torque transmission, comprising at least one first and one second connection element for connecting rotatable machine parts, such as passive and active drive shafts or connection elements of further coupling elements, and an axially interposed resilient disc assembly alternately connected to the first and second connection element via a plurality of attachment assemblies, so that the connection elements are connected to each other in a torsionally rigid, but axially and angularly movable manner, wherein the disc assembly is composed of a plurality of resilient discs, wherein at least one attachment assembly comprises a slotted centering sleeve insertable while establishing elastic interlocking engagement and/or preferably elastic play in complementary holes in one of the two connection elements and in the disc assembly while pre-centering the connection element relative to the disc assembly and while pre-centering the individual discs relative to each other, and further a threaded centering bolt threadable or threaded into the slotted centering sleeve while fixing and finally centering the connection element relative to the disc assembly.

Furthermore, the object is achieved by a coupling assembly comprising at least two such coupling elements as described here and in the following, and coupled with each other for power transmission via at least one of its connection elements, preferably by interposing an intermediate element.

Finally, the present invention is also achieved by a disc assembly for use with such a coupling element or such a coupling assembly as described here and in the following, comprising a plurality of resilient discs and a plurality of slotted centering sleeves inserted in or insertable into in holes in the discs while pre-centering the individual discs relative to each other while establishing elastic interlocking engagement and in particular elastic play.

"Elastic interlocking engagement", as will be described in detail in the following, means that the slotted centering sleeve is formed in such a manner that it can be supported in or inserted into at least one hole of the connection element and/or the disc assembly without the threaded-in centering bolt with a diameter reduced by external force application, i.e. preferably while it is pre-stressed to maintain this reduced diameter, wherein after removing the pre-stress or the application of external force, elastic expansion of the sleeve is achieved so that it is at least partially urged against at least one of the holes. The interlocking engagement with at least one hole, preferably the hole in the connection element, is thus established. "Preferably elastic play", as will be described in detail in the following, means that the slotted centering sleeve is formed in such a manner that it is supported in or can be inserted into at least one hole of the connection element and/or the disc assembly without the threaded-in centering bolt with play. By threading in the threaded centering bolt, expansion, and thus final centering, is achieved. This expansion is preferably elastic. Depending on the embodiment, it is possible to support or insert the slotted centering sleeve (prior to the insertion of the threaded centering bolt) in the connection element and the disc assembly while elastic interlocking engagement is achieved, or even while play, preferably elastic play, is achieved, or in the connection element while establishing elastic interlocking engagement and to support or insert it in the disc assembly with play, preferably elastic play, or vice versa. The "fixing and final centering" is preferably achieved by an increase in the diameter of the slotted centering sleeve during threading in of the threaded centering bolt.

The disc assembly has its connections usually arranged alternately with the connection elements, which means, for example, that with a disc assembly having four attachment points, each even attachment point is fixed to the first connection element and each odd attachment point is fixed to the second connection element. This is continued with disc assemblies having more than four attachment points, wherein preferably each disc assembly has an even number of attachment points. "Alternately connected" is also understood to mean an arrangement having a configuration which is different from this as long as the attachment of the disc assembly is partially on the first and partially on the second connection element so that the connection elements are torsionally rigidly but axially and angularly movably connected with each other.

An essential feature of the invention is the provision of a preferably elastically deformable slotted centering sleeve as part of the attachment assembly and fixing of the disc assembly on each connection element while using the same. Deformable preferably means that the cross-sectional diameter of the sleeve is configured to be variable and, in particular, expandable and reducible. Elastically deformable preferably means that the cross-sectional diameter of the sleeve is configured to be variable and, in particular, elastically expandable and reducible. The elastic configuration of the slotted centering sleeve means, for example, that the cross-section of the slotted centering sleeve can be elastically reduced in such a way that a preferably interference-free insertion of the slotted centering sleeve in respective holes of the connection element and the disc assembly is possible. The elasticity of the slotted centering sleeve enables, for example, a pre-stress, preferably in the form of a radial force, to be at least partially applied to the holes, leading to pre-centering of the disc assembly relative to the connection element.

A hole in the scope of the invention means any opening in the connection element and/or the disc assembly which serves for the insertion of the slotted centering sleeve. The holes are usually made with machining methods such as milling, drilling, spindling or the like methods. All and any methods known from the state-of-the-art are applicable therefor.

By inserting the preferably elastic slotted centering sleeve into the disc assembly or the connection elements, prefabricated connection element and/or prefabricated disc assemblies or individual components thereof, such as discs, may be used and simply brought into alignment with each other. It is thus no longer necessary to clamp together connection elements and disc assembly in an assembly apparatus, then to make a hole and subsequently to connect them with each other without prior opening of the assembly apparatus. This reduces assembly cost and, in particular, assembly time considerably, since prefabrication of the connection elements and the disc assemblies is possible.

The connection elements are preferably elements which serve for the connection of various machine parts. This means that both motors or engines and their respective components and components of other machines or components of downstream coupling elements or the like elements are conceivable. Basically the coupling element thus serves to connect two machine parts which are preferably axially or angularly arranged in a misaligned relationship. The slotted centering sleeve inserted into the hole preferably serves as an interlocking element which corrects the relative alignment between the connection element and the disc assembly, for example during the insertion of the threaded centering bolt and thus aligns them to a set fit or a pre-set fit.

The slotted centering sleeve can be configured in such a manner that it is elastically reduced in diameter by an additional device and can thus be inserted into the hole essentially without play. The diameter is thus reduced by the application of an external force. After insertion, the additional device is removed and pre-centering is achieved by the elastic expansion of the slotted centering sleeve. Elastic interlocking engagement is thus achieved. However, it is also possible to configure the slotted centering sleeve in such a manner that, in its inserted state, i.e. the state in which it has been inserted in the hole, it has a slightly smaller diameter than the holes so that it can be inserted with minimal play and without its own pre-stress, but with rougher pre-centering of the connection elements and the disc assemblies. A play is achieved; the sleeve can then preferably be elastically expanded to achieve final centering. Pre-stressing for this final centering is preferably only applied during threading in of the threaded centering bolt. Finally, it is possible to configure the slotted centering sleeve in such a manner that it has a slightly larger diameter than the holes of the connection element and/or the disc assembly and, it is reduced in diameter only during the insertion process, preferably while using a reduction-spreading head at the free end of the slotted centering sleeve or a reduction head receiver on at least one of the holes, and can thus be inserted into the hole while exerting its own pre-stress. Again, reduction in diameter is achieved by external force application, i.e. its insertion into a hole that is "too tight". Depending on the embodiment of the slot, the material of the slotted centering sleeve, the relative diameters of slotted centering sleeve and holes, or the material of connection elements and disc assemblies, pre-centering, pre-stressing and fixing of the slotted centering sleeve in the holes, preferably with elastic interlocking engagement, is achieved to a greater or lesser extent.

Preferably it is provided for the slotted centering sleeve and the threaded centering bolt to be formed in such a manner that the slotted centering sleeve is expanded as the threaded centering bolt is threaded in. In this way, fixing and final centering between the disc assembly and the connection elements is ensured. Threading in here also means other types of interlocking engagement, such as snap-in etc.

In this connection, in particular, the slotted centering sleeve and the threaded centering bolt are preferably configured in such a manner that, in an inserted state in which the threaded centering bolt has been threaded in, the threaded centering bolt is fixed in a finally centered manner while establishing interlocking engagement in the holes and thus fixes the disc assembly relative to each connection element.

The slotted centering sleeve is preferably elastically configured in such a manner that expansion is also elastic. This means that the sleeve can be removed again after removal of the threaded centering bolt.

Preferably, the expansion and fixing of the slotted centering sleeve is realized by means of thread pitch compression between the threaded centering bolt and the slotted centering sleeve. In other words, preferably the slotted centering sleeve and the threaded centering bolt are formed in such a way that the slotted centering sleeve is elastically expanded by the thread pitch compression as the threaded centering bolt is threaded in and/or, in an inserted state, in which the threaded bolt has been threaded in, it is fixed in a finally centered state in the holes while establishing interlocking engagement, and thus fixes the disc assembly relative to each connection element.

For this purpose, the slotted centering sleeve preferably comprises a thread congruent with a thread on the centering threaded bolt and feeding a radial force into the slotted centering sleeve in such a manner that the slotted centering sleeve is preferably radially expanded and thus its cross-section is changed.

The disc assembly is preferably composed or composable of one or more preferably resilient discs, wherein the slotted centering sleeve is preferably insertable while establishing elastic interlocking engagement and/or with elastic play into holes of the discs while pre-centering the individual discs relative to each other and/or relative to the connection element. This means that individual prefabricated resilient discs can be preferably slid over the slotted centering sleeve and thus be centered relative to each other. The package of discs thus formed, or the disc assembly thus formed, can then be mounted on the connection element, or be coupled therewith, and thus pre-centered relative to the connection element and subsequently fixed and finally centered by threading in the threaded centering bolt. An elastic interlocking engagement is understood to mean a state in which the slotted centering sleeve, after or during insertion, applies a pre-stress to at least one disc with the smallest hole by having its diameter pre-reduced. Preferably elastic play is understood to mean a play which is achieved, for example, by providing the cross-sectional diameter of the slotted centering sleeve at a diameter that is slightly smaller than the smallest hole in the disc assembly and the connection elements. In this way, relative pre-centering of the individual elements in which the holes are formed is achieved. Subsequently, expansion of the sleeve with resulting final centering can be caused by the threaded centering bolt. With the elastic interlocking engagement, the sleeve is urged against the side walls of the holes of the discs and/or of the connection elements even without the presence of the threaded centering bolt.

Preferably, by means of the slotted centering sleeve, the disc assembly can be arranged on the connection element as an independent component. This means that the disc assembly can be stockpiled as a package using the inserted slotted centering sleeve and then connected with each required connection element. It is also possible to add individual discs of the disc subassemblies as needed to the disc assembly and to connect and/or pre-adjust them by means of the inserted slotted centering sleeves. It is also possible to form the slotted centering sleeves in such a way that almost final centering of the individual discs relative to each other is achieved.

Preferably, the slotted centering sleeve comprises a flange, in particular at a free end region of the sleeve. This flange can be used to achieve fixing of the slotted centering sleeve on the connection element and/or the disc assembly in at least one direction. If the flange is larger than the hole, for example, the slotted centering sleeve can be inserted into the hole from one side and can be fixed from the other side against this flange and preferably by means of thread-insertion or the like insertion of the threaded centering bolt. This achieves not only an interlocking engagement but also a press fit of the individual components amongst each other.

Preferably, the attachment assembly and, in particular, the slotted centering sleeve and the inserted threaded centering bolt are formed in such a manner that fixing of the disc assembly on the connection element is achieved almost exclusively by an interlocking engagement and not, or only slightly, by a frictional or a press engagement of the individual components, i.e. the disc assembly and the connection elements relative to each other. Preferably, the ratio of the power transmission per press fit and interlocking engagement is at <1/10, preferably <1/30 and particularly preferably at <1/50.

Preferably the slotted centering sleeve has an internal thread preferably extending essentially over more than half the length and particularly preferably over the entire length of the slotted centering sleeve. This internal thread is formed such that threading in of the threaded centering bolt is possible. Preferably the slotted centering sleeve is formed such that its inner diameter in the area of the internal thread is smaller than the diameter of the threaded centering bolt. In this way the slotted centering sleeve is elastically expanded as the threaded centering bolt is threaded in. This elastic slotted centering sleeve guarantees final centering of the disc assembly, the individual discs and the connection elements relative to each other, as well as secure fixing of the thread-inserted threaded centering bolt, which is or was always held under pre-stress due to the elastic expansion. Preferably the expansion is initiated by the thread pitch compression between the internal thread of the sleeve and the external thread of the bolt. Preferably, no spreading cone or the like expansion element is provided in addition to the thread.

The slotted centering sleeve preferably comprises at least one slot extending from a free end of the sleeve along its circumferential surface and preferably to its opposite free end. This slot enables easy expansion of the slotted centering sleeve, or the reduction of the diameter of the slotted centering sleeve, if required.

As already described above, the slotted centering sleeve, in a pre-insertion state in which it has not yet been inserted in the hole of the connection elements and/or of the disc assembly, preferably has a slightly larger diameter then each hole, or than the smallest hole present and/or the slotted centering sleeve is elastically deformable to a diameter that is smaller than at least one of the holes and in particular the smallest of the holes. By these means easy and secure insertion of the slotted centering sleeve in the individual holes and fixing of the sleeve of the hole can be ensured even without the bolt. Moreover, pre-centering due to the pre-stress exerted on the hole is ensured.

Preferably, the slotted centering sleeve at least partially has a portion having a predefined surface friction value. This predefined surface friction value enables the precise adaption of the slotted centering sleeve in such a manner that it is held within the hole, for example, after insertion into the hole. This is only ensured by providing a predefined surface friction value. Moreover, the slotted centering sleeve is preferably configured in such a manner and has, in particular, a surface friction value in such a way that, in its inserted state, i.e. without threading in of the threaded centering bolt, it applies a pre-stress on at least one of the holes and is thus held within the hole and preferably held in an anti-twist manner during threading in of the threaded centering bolt. In particular, due to the provision of a predefined surface friction value in a particular portion on the slotted centering sleeve, anti-twist holding within the hole also during threading-in of the threaded centering bolt can be ensured. Variables for fixing the pre-stress or the holding force within the hole during threading-in of the threaded centering bolt include the wall thickness of the slotted sleeve, the slot size, the material quality, the hole size, and the sleeve size.

Such a predefined surface friction value can be achieved, for example, by applying suitable coatings and, in particular, by nitrocarburizing. Special lubricants or the like lubricating elements can also be provided on the slotted centering sleeve 4. Moreover, a selective surface treatment for generating a predefined surface friction value on the slotted centering sleeve is also conceivable. The manufacture of the slotted centering sleeve at least partially of a certain material is also conceivable in order to achieve a predefined surface quality and thus a predefined surface friction value.

The pre-stressing force of the sleeve is also preferably designed such that pre-centering and, in particular, pre-centering of the individual discs of the disc assembly or of the disc assembly relative to the connection element is ensured to an extent that is as precise as possible. This facilitates assembly and improves axial alignment of the individual components relative to each other.

Preferably, the slotted centering sleeve is designed such that, in an inserted state in which it has been inserted into the hole of the connection element and/or the disc assembly, but the threaded centering bolt has not yet been threaded in, its slot is essentially closed. Preferably, this slot is essentially closed, in particular, in an area at the end of a flange arranged at the free end region of the sleeve. It has been found that forces applied to the slotted centering sleeve, in particular during assembly can be dissipated by the sleeve in this manner while causing almost no deformation.

The internal thread of the slotted centering sleeve in an inserted state and/or in the threaded-in state, preferably has an offset and preferably a radial and/or axial offset in the area of the slot. Such offset guarantees, among other things, secure fixing of the threaded centering bolt in the internal thread. This offset can be both in the axial direction of the slotted centering sleeve, in the form of a "stepped arrangement" of the threads to the left and right of this slot, however, a radial offset is also conceivable which is achieved, for example, by irregularly reducing the slotted centering sleeve diameter with respect to a radius to the left and right of the slot. Of course, a combination of the two types of offset is also conceivable.

As seen in the cross-section of the slotted centering sleeve, the circumferential surfaces of the sleeves bordering the slot are preferably formed to extend in parallel planes to each other. It has been found that when the diameter of the slotted centering sleeve is deformed, the threaded centering bolt is particularly securely fixed in the slotted centering sleeve.

Moreover it should be noted that the slotted centering sleeve can have one or a plurality of slots. It is also conceivable for one or more slots to extend from the free end in the direction of the other free end, but not completely to the free end. Preferably, they extend at least to the center of the sleeve. The selection of the type of slot, and in particular its geometry, can also influence fixing within the holes and pre- and final centering characteristics of the slotted sleeve. In particular, it should be noted in this context that it is conceivable, for example, to configure the slotted centering sleeve in such a manner that in the area of the holes in the connection elements a greater pre-stressing force is applied to the holes than is the case in the region of the disc assembly, and in particular than is the case in an inserted state, i.e. prior to threading in the threaded centering bolt. Preferably, the slotted centering sleeve is designed such that it provides elastic interlocking engagement in the area of the hole of the connection element and elastic play in the area of the holes of the disc assembly, in particular, in the inserted state. In this way, fixing of the sleeve is ensured at the connection elements, wherein deformation of the disc assembly is prevented, in particular, prior to threading in of the bolt. When the disc assembly is formed of thin discs, in particular, they can be simply coupled or slid onto the slotted centering sleeve, without damaging them. It is also conceivable to design the slotted centering sleeve in such a manner that, in the inserted state, it applies or provides a smaller pre-stressing force and/or has greater play in the area of the disc assembly than is the case in the area of the connection element.

This can be achieved, for example by providing a greater number of slots or larger slots in an area and, in particular, the area of the slotted centering sleeve arranged within the holes of the disc assembly, or to provide reduced material thickness or softer material or a combination of these arrangements, than is the case in any other area and, in particular, in the area of the slotted centering sleeve which is arranged in the area of the connection element.

Further embodiments of the invention can be derived from the dependent claims.

DESCRIPTION OF THE DRAWINGS

The invention will be described in the following with reference to two embodiments explained in more detail by the appended drawings, wherein:

FIG. 1 schematically shows an isometric view of an embodiment of the coupling element according to the present invention;

FIG. 2 schematically shows an isometric explosive view of the embodiment according to FIG. 1;

FIG. 3 schematically shows two isometric views of an embodiment of a slotted centering sleeve according to the present invention as used in FIG. 1;

FIG. 4 schematically shows an isometric view of part of the coupling element according to FIG. 1;

FIG. 5 schematically shows a further isometric exploded view of the embodiment according to FIG. 1;

FIG. 6 schematically shows a cross-section of the embodiment according to FIG. 1;

FIG. 7 schematically shows a further cross-section of the embodiment according to FIG. 1;

FIG. 8 schematically shows a partial sectional view of the embodiment according to FIG. 1;

FIG. 9 schematically shows a cross-section of the slotted centering sleeve according to FIG. 3;

FIG. 10 schematically shows a longitudinal sectional view of the slotted centering sleeve according to FIG. 3;

FIG. 11 schematically shows a detail of the cross-section according to FIG. 10; and FIG. 12 schematically shows an isometric exploded view of an embodiment of the coupling assembly according to the present invention.

DETAILED DESCRIPTION

In the following, the same reference numerals will be used for the same and equivalent components, wherein exponents are sometimes used.

FIGS. 1, 2, 4, and 5 show views of an embodiment of the coupling element 1 according to the present invention, while corresponding sectional views are shown in FIGS. 6 to 8. FIG. 3 and FIGS. 9 to 11, on the other hand, show a slotted centering sleeve 4 which can be used in the embodiment of the coupling element 1 according to the present invention and in the embodiment of a coupling assembly 40 shown in FIG. 12.

While various embodiments and specifications of possible embodiments will be described in the following with reference to the drawings, it should be noted that these embodiments and specifications need not necessarily always be used in combination with each other. A coupling element can thus also be configured without or with only part of the relevant specifications, as mentioned, for example, in the claims or in the above-mentioned description.

The coupling element 1 shown here as an example comprises two connection elements, namely a first connection element 10 and a second connection element 20 connected to each other via a disc assembly 30 in a torsionally rigid, but axially and angularly movable manner. The axis relevant here is shown as axis $A_x$ (see FIGS. 1 and 2).

In detail, the resilient disc assembly 30 is connected alternately to the first and second connection elements 10, 20 via a plurality of attachment assemblies 2. In this way, the first connection element 10 can be moved relative to the second connection element 20 axially and also at an angle to axis $A_x$. However, when the connection elements 10, 20 are rotated relative to each other about axis $A_x$, power is transmitted almost without play.

At least one attachment assembly 2 according to the invention comprises an elastic slotted centering sleeve 4 which can be inserted while establishing elastic interlocking engagement or elastic play in complementary holes 16, 26, 36 in one of the two connection elements 10, 20 and in the disc assembly 30 while pre-centering the connection element relative to the disc assembly 30. This means that by inserting the slotted centering sleeve 4 in the holes 16, 26 of the connection element 10 and 20, respectively, and the holes 36 of the disc assembly 30, relative pre-centering between these components is achieved. Pre-centering means, for example, fixing of the two components relative to each other and/or rough alignment of the two components with each other and/or fine alignment of the components relative to each other, in particular in such a manner that the axial alignment between the connection element and the disc assembly required for the operation of the coupling element 1 has been almost or even fully established.

Furthermore, the threaded centering bolt 8 is provided which is threadable or threaded into the slotted centering sleeve 4 while fixing and finally centering the connection element 10 or 20 relative to the disc assembly 30. In this way, a coupling element 1 is formed that is very easy to assemble and can be assembled, in particular, from prefabricated components. Moreover, play-less attachment of the disc assembly 30 on each connection element 10, 20 is ensured by the design of the attachment assembly 2 by means of the slotted centering sleeve 4 and the threaded centering bolt 8.

As shown, in particular, in FIGS. 2 and 5, the disc assembly 30 is preferably composed of one or more resilient discs 32. Preferably, the slotted centering sleeve 4 is designed such that it can be inserted into the holes 36 of the discs 32 while establishing an elastic interlocking engagement and/or with elastic play. Again, the individual discs 32 and/or preferably the individual discs 32 and the thus formed disc assembly 30 relative to the connection element 10 or 20 are preferably pre-centered with respect to each other.

As shown, in particular, in FIG. 2, each connection element comprises holes 6, 26 in which the slotted centering sleeve 4 can be inserted in such a manner that a flange 5 of the slotted centering sleeve 4 is inserted into the connection element 10 or 20 in an essentially flush or recessed manner. In the present embodiment, insertion of the slotted centering sleeve is from the side 24 of the connection element 10 or 20 facing away from the disc assembly 20.

The slotted centering sleeve 4 preferably protrudes on the side 22 of the connection element 10 or 20 facing the disc assembly 30 so that the individual discs 32 or the disc assembly 30 can be slid onto its free end 9. The disc assembly is thus pre-centered relative to the connection element 10 or 20.

Subsequently, the disc assembly 30 can be finally centered and/or fixed relative to the connection element 10 or 20 by threading in the threaded centering bolt 8.

In the present embodiment (see FIG. 2) the bolt 8 extending on the connection axis $A_F$ is passed through the hole 36 of the disc assembly 30 and threaded together with the slotted sleeve 4 which in turn is inserted into the hole 26 of the connection element 20. The disc assembly 30 is thus fixed on the connection element 20 in this area. For inserting the threaded centering bolt 8, the other connection element 10 has a hole 16' in the present embodiment, that is larger than the head of the threaded centering bolt 8 so that the threaded centering bolt 8 can be passed through the connection element 10 and remains movable in the axial direction, in particular, but also in the radial direction. In this way, the axial and angular mobility of the two connection elements 10, 20 is ensured with respect to each other.

As can be seen, in particular, from FIG. 3, the slotted centering sleeve 4 has an internal thread 11 into which the threaded centering bolt 8 can be threaded in such a manner that the diameter of the slotted centering sleeve is expanded. For this purpose the slotted centering sleeve 4 has at least one slot 13 extending from a free end 7 of the sleeve 4 along its circumferential surface 15 and preferably up to an opposite free end 9. Instead of this one slot 13, a plurality of slots may also be arranged and, in particular, slots that only extend partially from each free end 7, 9 in the direction of the other free end 9, 7. It is also possible to provide a different slotted centering sleeve geometry or characteristic and/or different or varied slot geometries at certain positions of the slotted centering sleeve, such as at the free end area 9, i.e. the end area which is arranged in the area of the disc assembly 30 (see FIG. 2), so that, among other things, a different pre-stress, pre-adjustment, final adjustment etc. can be applied to the disc assembly 30 and the connection elements 10 or 20. Besides the selective arrangement of the slots, the material thickness, the slot geometry or the material of the sleeve 4 as such may also be varied. It is also conceivable to provide different hole diameters in the disc assembly 30 and the connection element 10 or 20.

Preferably, the slotted centering sleeve 4, in a pre-insertion state, in which it has not been inserted in the holes 16, 26, 36 of the connection element 10 or 20 and/or of the disc assembly 30, is provided with a slightly larger diameter than each hole 16, 26, 36. By making the slotted sleeve elastic, it can be reduced in diameter and thus be inserted into each hole 16, 26, 36 with a reduced diameter. Basically it is advantageous to form the slotted centering sleeve elastic in such a manner that it may be deformed to a smaller diameter than that of at least the smallest of the holes 16, 26, 36.

Preferably, the slotted centering sleeve 4 has at least partially a portion 17 (see FIG. 3) having a predefined surface friction value. This surface friction value is preferably adjusted such that the slotted centering sleeve 4 is held in the holes 16, 26 and/or 36 in such a manner that it is held in an anti-twist way during threading in of the threaded centering bolt 8. In this way, countering of the slotted centering sleeve 4 is not necessary in order to thread in the threaded centering bolt 8. This allows, in particular, the coupling element 1 to be designed extremely flat, and in particular allows installation of the coupling element 1 in such a way that access with a tool to side 24 is impossible from which the slotted centering sleeves 4 are inserted. It is then simply not necessary. In this way a coupling assembly 40 according to FIG. 12 can be manufactured, for example, in which the connection element 10 of a first coupling element 1 is directly connected with the connection element 20' of a second coupling element 1' without an intermediate element.

Preferably and as shown in FIG. 2, in particular, the slotted centering sleeve 4 is designed such that, in an inserted state in which it has been inserted in the holes 16, 26, 36 of the connection element 10, 20 and/or the disc assembly 30, into which the threaded centering bolt 8 has not yet been threaded, however, it has a slot 13 that is almost closed, and in particular fully closed at least in the area of the flange 5 arranged at the free end 7 of the sleeve 4.

This can be seen, for example, in FIG. 2 at the slotted centering sleeve designated with reference numeral 4' having a smaller slot in particular in the area of the flange in contrast to the slotted centering sleeve 4 which has not yet been inserted.

FIG. 4 shows a detailed view of the embodiment of the coupling element 1 according to the invention shown, in particular, in FIG. 1 wherein here, only the second connection element 20 is shown which is connected with the disc assembly 30 via the attachment assemblies 2. The connection element 10 shown in the other figures is not shown here.

It clearly shows the fixing of the disc assembly 30 via the attachment assemblies 2 at "every other hole" in the disc assembly or the connection element 20, i.e. all even-numbered holes shown here with reference numerals 26a.

All odd-numbered holes, shown here with reference numerals 26b, can be used to connect the package consisting of the second connection element 20 and the disc assembly 30 with the first connection element 10 (see, for example, FIG. 5).

As shown, in particular, in FIGS. 4 and 5, the coupling element 1 preferably comprises a plurality of spacing elements 27 arranged in the area of the holes 16a, 26a, 36a or 16b, 26b, 30 of the connection elements and the disc assembly 30 and ensuring clearance between these components. The connection elements 10, 20 (see FIGS. 4 and 5) moreover include attachment assemblies 28 for fixing each connection element to further machine parts (not shown) and, as described in more detail in the following, to other coupling elements or the like components.

FIGS. 9 to 11 show sectional views and detailed sectional views of a possible embodiment of the slotted centering sleeve 4 used with the coupling element 1. As already explained, the slotted centering sleeve 4 preferably has a flange 5 arranged at the free end 7 of the slotted centering sleeve 4. In this embodiment, the other free end 9 has no such flange so that insertion of the slotted centering sleeve 4 into holes 16, 26, 36 (see, for example, FIG. 2) of the coupling element 1 is possible. Moreover, an insertion head, such as a chamfer of the free end 9, for easy insertion of the slotted centering sleeve into the holes 16, 26, 36 can also be provided at this free end 9.

The slotted centering sleeve 4 further includes the slot 13 that allows elastic expansion and/or reduction of the diameter of the slotted centering sleeve 4.

The slot 13, as shown, for example in FIG. 9, is preferably designed such that circumferential surface edges 21 bordering the slot 13 are formed to extend in parallel planes to each other.

Further preferably the internal thread 11 of the slotted centering sleeve 4 (see, for example, FIGS. 10 and 11), in the inserted state mentioned above and/or in the threaded-in state mentioned above, is provided with an offset 19 in the area of the slot 13. This offset 19 of the thread 11 is shown in detail in FIG. 11 showing a portion of the thread according to FIG. 10. The offset 19 has the effect that the individual threads 18 of the thread do not linearly feed one into the other but are provided with an offset in the area of the slot when the slot 13 is completely closed.

This creates a pinching action in the thread pitch during insertion of the threaded centering bolt 8 and ensures securing of the same in the threaded-in state.

FIG. 12 shows an isometric view of an embodiment of the coupling assembly 40 according to the present invention, comprising at least two coupling elements 1 or 1', as shown, for example, in FIGS. 1 and 2. For fixing of the coupling elements 1 or 1' among each other, two connection elements 10, 20 are connected with each other via the above-mentioned attachment assemblies 28 and, for example, via bolt connections, provided on the connection elements. However, it is also possible to connect the two coupling element 1, 1' via a distancing part, such as a shaft, which is then fixed in a corresponding manner on the connection elements 10, 20' and thus allows joining of the two coupling elements 1, 1' with each other.

In the preceding specification, the invention has been described with reference to a specific embodiment of the invention. It is obvious, however, that various modifications and changes may be made without deviating from the broader spirit and scope of the invention as described in the appended claims.

However, other modifications, variants and alternatives are also possible. The specification, the drawings and examples are thus to be construed in an illustrative rather than a limiting sense.

Reference numerals indicated in the claims in parentheses are not to be construed as limiting the claim. The term "comprising" does not preclude the presence of other features or steps than the ones indicated in the claim. Moreover, the words "a" or "an" are not to be construed as meaning "only one", but are used to mean "at least one" and do not preclude a plurality. The pure fact that certain dimensions are indicated in different claims does not mean that a combination of these dimensions cannot be advantageously used.

Even if different embodiments of the present invention have been described above, be it with reference to the accompanying drawings or be it in general terms, it should be understood that the invention is not limited to these embodiments. References in the present specification to "the embodiment" or "one embodiment" mean that a certain feature, a certain structure or a certain characteristic described in connection with the embodiment is included in at least one embodiment of the present invention. Also, the appearance of the clauses "in the embodiment" or "in one embodiment" in various places of the present description does not necessarily refer to one and the same embodiment. Further, it should be noted that certain features, structures or characteristics of one or more embodiments can be combined in any suitable manner or removed in order to form new, not explicitly described embodiments.

LIST OF REFERENCE NUMERALS 1 coupling element
2 attachment assembly
4 slotted centering sleeve
5 flange
7 free end
8 threaded centering bolt
9 free end
10 first connection element
11 internal thread
13 slot
15 circumferential surface
16 hole
16a, 16b hole
17 portion having a predefined surface friction value
19 offset
20 second connection element
21 circumferential surface edge
22 facing side
24 side facing away
26 hole
26a, 26b hole
27 spacing element
28 attachment assembly
30 disc assembly
32 disc
36 hole
40 coupling assembly
$A_x$ axis
$A_F$ axis

The invention claimed is:

1. A coupling element for axial torque transmission, said coupling element comprising:
at least one first connection element and one second connection element for connecting rotatable machine parts;
an axially interposed resilient disc assembly alternately connected to the first connection element and the second connection element, so that the connection elements are connected to each other in a torsionally rigid but axially and angularly moveable manner, wherein the disc assembly is composed of a plurality of resilient discs;
a slotted centering sleeve insertable while establishing elastic interlocking engagement and/or elastic play in complementary holes in one of the two connection elements and in the disc assembly while pre-centering the one of the two connection elements relative to the disc assembly and while pre-centering the individual discs relative to each other; and a threaded centering bolt or threaded into the slotted centering sleeve while fixing and centering the one of the two connection elements relative to the disc assembly;

wherein the slotted centering sleeve and the threaded centering bolt are formed so that the slotted centering sleeve is elastically expanded by the thread pitch compression when the threaded centering bolt is threaded in and/or, in an installed state in which the threaded centering bolt has been threaded in, is fixed in a finally centered state while in interlocking engagement in the holes and thus fixes the disc assembly relative to each connecting element.

2. The coupling element according to claim 1, in which the slotted centering sleeve includes a flange at a free end area of the sleeve.

3. The coupling element according to claim 1, in which the slotted centering sleeve includes an internal thread extending over more than half the length of the slotted centering sleeve.

4. The coupling element according to claim 3, in which the internal thread of the slotted centering sleeve, in an inserted state and/or in a threading state, has an offset proximal the slot.

5. The coupling element according to claim 1, in which the slotted centering sleeve includes one slot extending from a free end of the sleeve along a circumferential surface of the sleeve.

6. The coupling element according to claim 5, in which as seen in cross-section of the slotted centering sleeve, edges of a circumferential surface of the sleeve bordering the slot are formed to extend in parallel planes.

7. The coupling element according to claim 1, in which the slotted centering sleeve, in a pre-insertion state in which it has not been inserted in the hole of the one of the two connection elements and/or the disc assembly, has a slightly larger diameter than each hole and/or is elastically deformable to a smaller diameter than that of the smallest one of the holes.

8. The coupling element according to claim 1, in which the slotted centering sleeve includes a portion having a predefined surface friction value.

9. The coupling element according to claim 1, in which the slotted centering sleeve is elastic in such a manner that, in an inserted state in which it has been inserted in one of the holes of the one of the two connection elements and/or the disc assembly, the slotted centering sleeve exerts a pre-stress on at least one of the holes and is thus held in the at least one of the holes in an anti-twist manner during thread-insertion of the threaded centering bolt.

10. The coupling element according to claim 1, in which the slotted centering sleeve is formed thus that, in an inserted state in which it has been inserted in one of the holes of the one of the two connection elements and/or the disc assembly, but the threaded centering bolt has not yet been threaded in, proximal a flange arranged at a free end area of the sleeve, the sleeve has a completely closed slot.

11. A coupling assembly comprising at least two coupling elements according to claim 1, which are coupled to each other for power transmission via at least one of the connection elements while interposing an intermediate element.

* * * * *